July 21, 1931.  J. W. BROWN, JR  1,815,829
MEAT CHOPPER
Filed Feb. 28, 1929
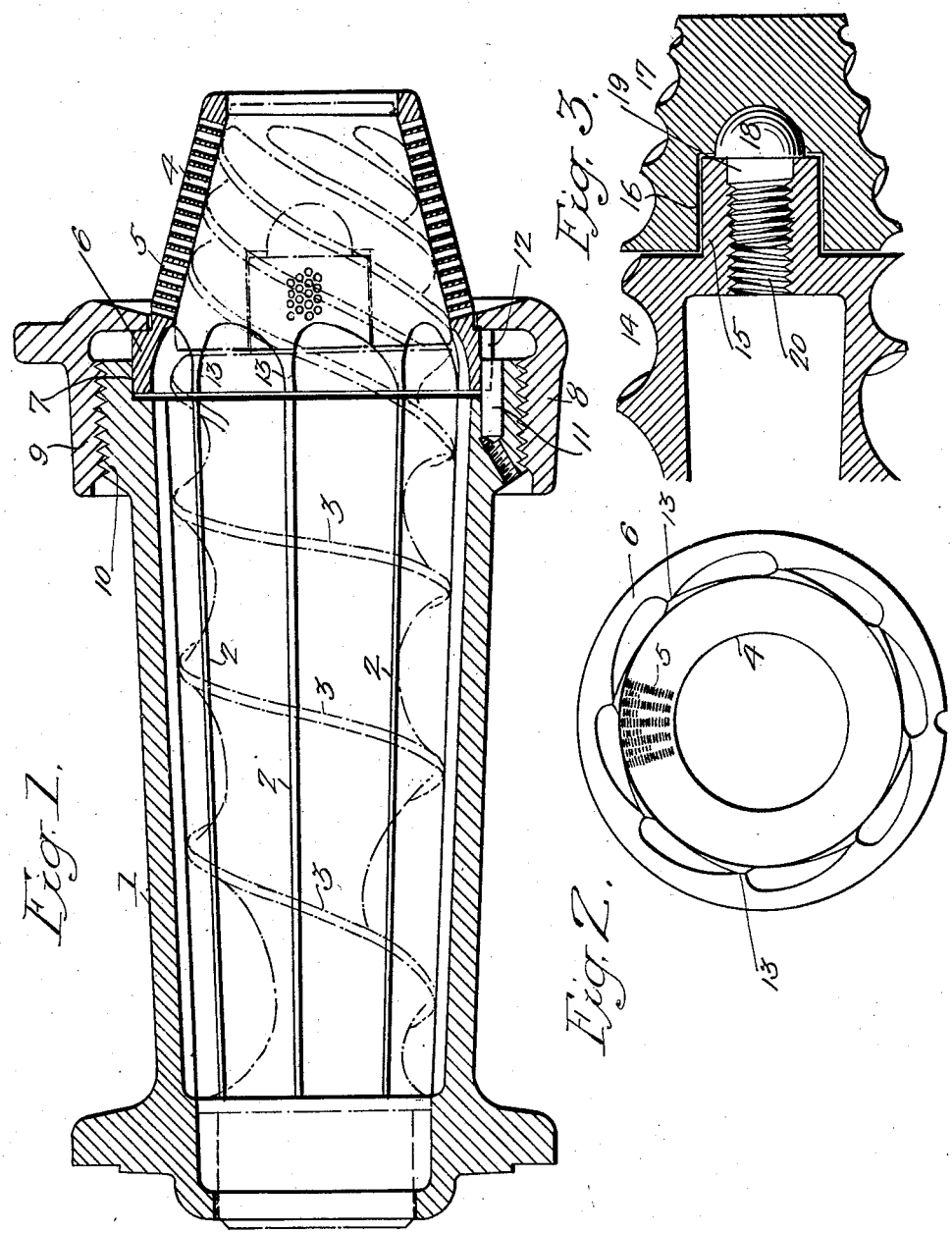
Inventor:
John Wilson Browne Jr.
by his Attorneys,
Howson & Howson Patented July 21, 1931

1,815,829

UNITED STATES PATENT OFFICE

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA

MEAT CHOPPER

Application filed February 28, 1929. Serial No. 343,459.

My invention relates to certain improvements in the cutter heads of choppers for meat and like substances.

One object of my invention is to provide means for holding the meat from rotating in the chopper while it is being forced into the perforated conical cutting head by the feed screw.

Another object of the invention is to insure the proper seating of the conical cutter in the perforated cutting head, and to hold the outer end of the feed screw in proper alignment with the barrel of the chopper.

In the accompanying drawings:

Fig. 1 is a sectional plan view of the barrel of a meat chopper, with the perforated conical cutting head and clamping screw;

Fig. 2 is a rear end view of the conical cutting head; and

Fig. 3 is a sectional view of a portion of the feed screw and the conical cutter.

In the present instance, 1 is the barrel of a power meat chopper, having a series of longitudinal internal ribs 2, which prevent the meat rotating with the screw, which is shown by dotted lines 3 in Fig. 1. 4 is the conical cutting head which has a number of perforations 5 of any suitable size and a flange 6 formed on the rear end of the cutting edge, which rests in a recess 7 in the outer end of the barrel 1.

8 is a clamping ring which bears upon the flange 6 of the cutting head and has a screw-threaded portion 9, the threads of which mesh with the threads 10 on the barrel 1. A pin 11, forced into the barrel, extends into a notch 12 in the cutting head, to prevent the head turning in the barrel.

The inner surface of the cutting portion of the cutting head is smooth, the projection of the meat into the perforations being depended upon to hold the meat from turning as it is forced into the cutting head and the projection severed, and in order to prevent the meat turning with the screw as it passes from the control of the ribs of the barrel, short ribs 13 are formed at the rear end of the cutting head, which preferably align with the ribs of the barrel, and these ribs extend preferably to the line of the first series of perforations, so that the meat is positively held from turning while being conveyed by the feed screw from the hopper, which is at the rear end of the barrel and not shown, to the perforations in the cutting head.

The machines to which this invention is applied are usually of the power type and of considerable diameter. If the meat is not positively held not only by the ribs of the barrel but by the continuations of the ribs on the cutting head, that portion of the meat at the forward end of the machine will turn with the screw, preventing further feeding of the meat, and, consequently, the cutting operation will cease, but by my invention the meat is held from turning until it is severed by the cutter at the end of the feed screw passing the perforations in the cutting head.

In the present instance on the end of the feed screw 14 is a rectangular boss 15 which fits a like cavity 16 in the conical cutter 17. The cavity is of sufficient size to allow the conical cutter to have a certain amount of play, so that it can seat itself properly in the conical perforated cutting head. On the end of the boss is a projection 18 in the form of a section of a ball which, in the present instance, is made separate from the feed screw, having a threaded stem 19 which is adapted to a threaded opening 20 in the boss.

In the conical cutter is a socket, in which the ball 18 finds its bearing. This socket is located about midway of the length of the conical cutter, so as to allow the cutter to properly seat itself in the conical perforated head. The ball-and-socket being on the longitudinal line of the feed screw, it forms a center bearing for the outer end of the feed screw, keeping it in proper alignment.

I claim:

1. The combination in a cutter for meat and like substances, of a barrel; a feed screw mounted in the barrel; a conical perforated cutting head secured to the barrel; a conical cutter adapted to the perforated conical head; a ball-and-socket joint between the cutter and the feed screw located substantially midway between the two ends of the cutter; and a loose driving connection between the screw and the cutter, the ball-and-socket being on the longitudinal line of the feed screw and acting to retain the outer end of the screw in alignment.

2. The combination in a cutter for meat and like substances, of a barrel; a conical perforated cutting head secured to the barrel; a feed screw mounted in the barrel, said feed screw having a rectangular boss; a ball segment projecting from the end of the boss; and a cutter having a socket for the ball segment and having a loose fit on the boss to allow the cutter to seat itself in the perforated cutting head.

3. The combination in a cutter for meats and like substances, of a barrel having ribs therein which prevent the meat turning within the barrel; a perforated conical cutting head; means for securing the cutting head to the end of the barrel, said cutting head having perforations into which the meat is forced and having a series of short ribs at its end aligning with the ribs of the barrel and extending to the first series of perforations in said head; a feed screw; and a separate conical cutter mounted on the end of the feed screw and arranged to turn therewith, the ribs at the inner end of the conical cutting head preventing the meat turning after it leaves the ribs of the barrel and prior to its entering the perforations in the cutting head.

JOHN WILSON BROWN, Jr.